(12) United States Patent
Queen (10) Patent No.: US 11,594,935 B2
(45) Date of Patent: Feb. 28, 2023

(54) NORMALIZING LATERAL REED CRITICAL FREQUENCY IN VERTICAL ELECTRIC MACHINES

(71) Applicant: Siemens Industry, Inc., Alpharetta, GA (US)

(72) Inventor: Ryan Edward Queen, Amelia, OH (US)

(73) Assignee: Siemens Large Drives LLC, Alpharetta, GA (US)

( * ) Notice: Subject to any disclaimer, the term of this patent is extended or adjusted under 35 U.S.C. 154(b) by 238 days.

(21) Appl. No.: 17/069,562

(22) Filed: Oct. 13, 2020

(65) Prior Publication Data
US 2021/0242749 A1 Aug. 5, 2021

Related U.S. Application Data

(60) Provisional application No. 62/968,472, filed on Jan. 31, 2020.

(51) Int. Cl.
*H02K 5/24* (2006.01)
*H02K 5/20* (2006.01)
*H02K 5/22* (2006.01)

(52) U.S. Cl.
CPC ............... *H02K 5/20* (2013.01); *H02K 5/22* (2013.01)

(58) Field of Classification Search
CPC .. H02K 5/20; H02K 5/22; H02K 5/24; H02K 7/16; H02K 5/04; H02K 5/06
USPC .......................................................... 310/51
See application file for complete search history.

(56) References Cited

U.S. PATENT DOCUMENTS

| | | | |
|---|---|---|---|
| 2008/0084140 A1* | 4/2008 | Kim ...................... | F04D 25/064 310/67 R |
| 2014/0166844 A1* | 6/2014 | Lyle ....................... | F16F 15/02 248/560 |
| 2014/0167544 A1* | 6/2014 | Lyle ....................... | H02K 5/24 248/560 |

* cited by examiner

*Primary Examiner* — Michael Andrews (57) ABSTRACT

A vertical electric machine comprises a specific structure that defines a double box construction for normalizing the vertical electric machine structure such that its two reed critical frequencies occur at a same frequency. The double box construction includes a first stiffness member having a first side wall in a lateral "X" direction and a second stiffness member having a second side wall in a lateral "Y" direction such that the second side wall is rotated 90 degrees relative to the first side wall. The first stiffness member and the second stiffness member are configured to produce equal stiffness in both lateral directions "X" and "Y".

14 Claims, 5 Drawing Sheets

Provide a specific structure that defines a double box construction for normalizing a vertical electric machine structure such that its two reed critical frequencies occur at a same frequency, wherein the double box construction includes:

a first stiffness member having a first side wall in a lateral "X" direction, and a second stiffness member having a second side wall in a lateral "Y" direction such that the second side wall is rotated 90 degrees relative to the first side wall, wherein the first stiffness member and the second stiffness member are configured to produce equal stiffness in both lateral directions "X" and "Y".

NORMALIZING LATERAL REED CRITICAL FREQUENCY IN VERTICAL ELECTRIC MACHINES

BACKGROUND

1. Field

Aspects of the present invention generally relate to a vertical electric machine with a double box structure that normalizes Lateral Reed Critical Frequency.

2. Description of the Related Art

In vertical electric machines, the reed critical (natural frequency in which the entire structure vibrate laterally) often occurs at different frequencies based on different stiffness of the lateral "X" and the lateral "Y" directions. Structural natural frequency, also referred to as reed critical frequency (RCF), is the single greatest factor which prevents excessive vibration in a vertically suspended pump. Operating close to or on a structural natural frequency will result in high vibration levels.

The RCF is an important issue regarding to the dynamics of vertical motor-based systems and is defined in the NEMA MG-1/2011 standard Part 20.23. RCF is a required information to be supplied to the driven machine manufacturer. The correct value of the RCF of the electric motor is a crucial information for the customer in a way to avoid resonant conditions of the entire system and production losses. The RCF of an electric motor is defined as the first natural frequency of the vertical motor mounted on a rigid and massive base. The name "reed" relates to the mode shape of such natural frequency that is similar to the shape of a reed or a bamboo when it swings.

In prior systems, the reed critical frequencies occurred at two different frequencies. Prior systems would require the customer to block out operational ranges that are larger than need be since there is a spread in the reed critical frequencies.

Therefore, there is a need for a simplified means to normalize the vertical machine structure such that its two reed critical frequencies occur at the same frequency.

SUMMARY

Briefly described, aspects of the present invention relate to a specific structural design consisting of a double box construction can be used to produce equal stiffness both lateral directions in a vertical electric machine. This is accomplished by using the stiffness members side walls and then creating an additional set of stiffness member side walls but rotated 90 degrees. The function of the disclosed invention is to normalize the vertical machine structure such that its two reed critical frequencies occur at the same frequency. The disclosed invention is used to reduce the block out ranges of reed critical frequencies by eliminating the non-symmetry of the two different lateral directions. This solves the problem of machine users not being able to vary the speed of vertical machines over large speed ranges. This invention significantly reduces the machine users required block out range. This invention comprises of a rectangular box design with cutouts for airflow in one direction which produces a higher stiffness axis and a lower stiffness axis as well as a secondary rectangular box design which surrounds the first and has its airflow cutouts rotated 90 degrees to produce an overall stiffness which becomes uniform in both axis.

In accordance with one illustrative embodiment of the present invention, a vertical electric machine is provided. The vertical electric machine comprises a specific structure that defines a double box construction. The double box construction includes a first stiffness member having a first side wall in a lateral "X" direction and a second stiffness member having a second side wall in a lateral "Y" direction such that the second side wall is rotated 90 degrees relative to the first side wall. The first stiffness member and the second stiffness member are configured to produce equal stiffness in both lateral directions "X" and "Y".

In accordance with one illustrative embodiment of the present invention, a method of normalizing a vertical electric machine structure such that its two reed critical frequencies occur at a same frequency is provided. The method comprises providing a specific structure that defines a double box construction. The double box construction includes a first stiffness member having a first side wall in a lateral "X" direction and a second stiffness member having a second side wall in a lateral "Y" direction such that the second side wall is rotated 90 degrees relative to the first side wall. The first stiffness member and the second stiffness member are configured to produce equal stiffness in both lateral directions "X" and "Y".

DETAILED DESCRIPTION

To facilitate an understanding of embodiments, principles, and features of the present invention, they are explained hereinafter with reference to implementation in illustrative embodiments. In particular, they are described in the context of a vertical electric machine with a double box structure that normalizes Lateral Reed Critical Frequency. Reed critical frequency (RCF) is the structural natural frequency associated with vertically oriented, cantilevered structures. A very common application is a vertical electric motor/pump. Major variables that effect the reed critical frequency are: Mass (amount and position of CG), Stiffness of the structure, and Interfacing connections. For product development two methods of finite element analysis (FEA) are utilized: Accuracy—Full modal analysis with harmonic excitation and Speed (reduced model)—Static analysis with constant excitation, fixed mass, industry accepted calculations. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the vertical electric machine with a double box construction according to the present disclosure are described below with reference to FIGS. 1-6 herein. Like reference numerals used in the drawings identify similar or identical elements throughout the several views. The drawings are not necessarily drawn to scale.

Figure 1:
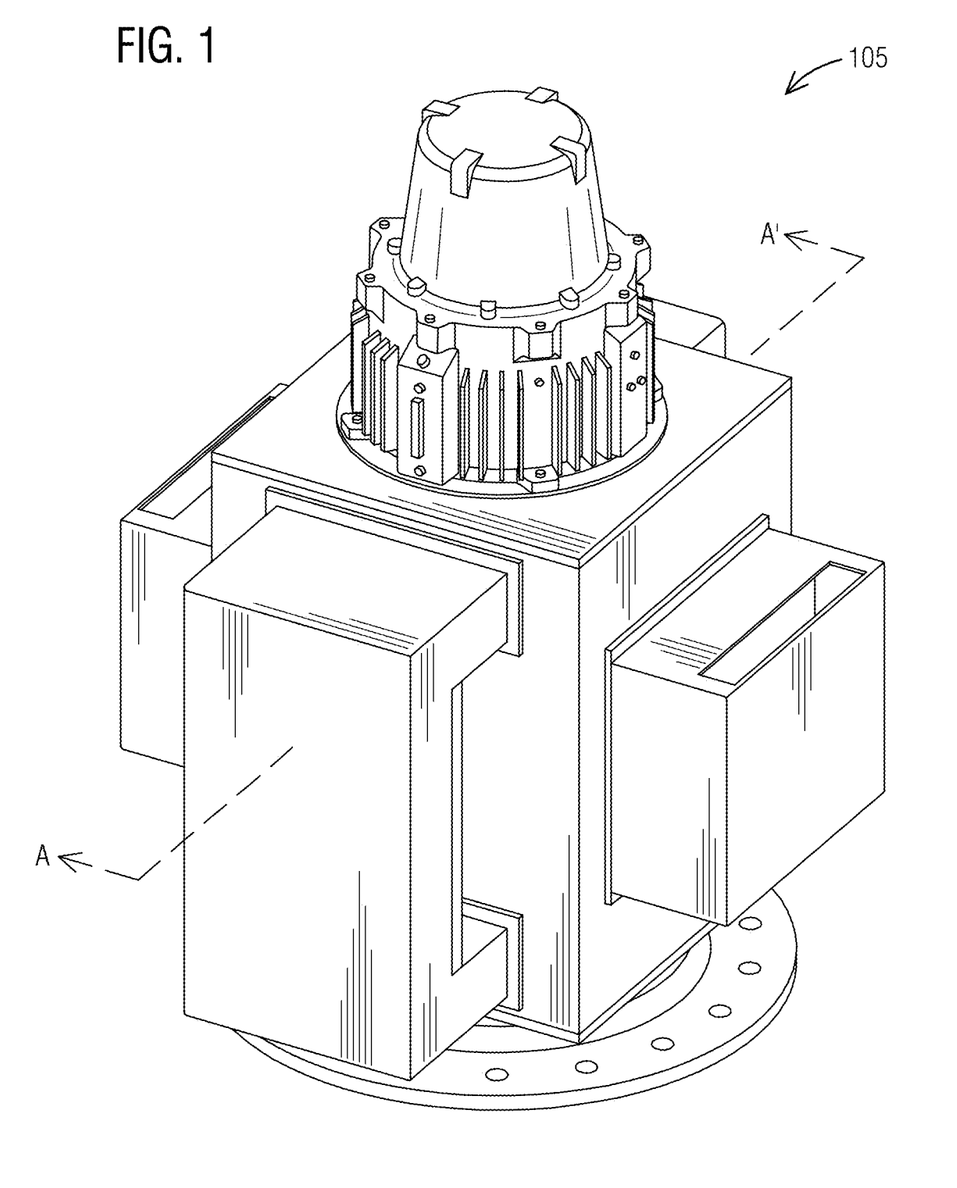
FIG. 1 illustrates a perspective view of a vertical electric machine in accordance with an exemplary embodiment of the present invention.

Consistent with one embodiment of the present invention, FIG. 1 represents a perspective view of a vertical electric machine 105 in accordance with an exemplary embodiment of the present invention. Reed frequency of the vertical electric machine 105 is described with respect to an example system next. In a single degree of freedom system, the static deflection of the mass ($_{\Delta s}$; inches) is related to the resonant frequency of the system ($f_n$, cycles per minute) as follows:

$$f_n = (1/2\pi)\sqrt{\frac{g}{\Delta s}}$$

Where: g=1389600 in/min²

Vertical or other flange-mounted induction machines are frequently mounted on some part of the driven (or driving) machine such as a pump adapter. The resulting system may have a radial resonant frequency (reed frequency) the same order of magnitude as the rotational speed of the induction machine. This system frequency can be calculated from the preceding equation. When the resonant frequency of the system is too close to the rotational speed, a damaging vibration level may result. The vertical induction machine manufacturer should supply the following information to aid in determining the system resonant frequency, $f_n$ a. Machine weight b. Center of gravity location—This is the distance from the machine mounting flange to the center of gravity of the machine, c. Machine static deflection—This is the distance the center of gravity would be displaced downward from its original position if the machine were horizontally mounted. This value assumes that the machine uses its normal mounting and fastening means but that the foundation to which it is fastened does not deflect.

Figure 2:
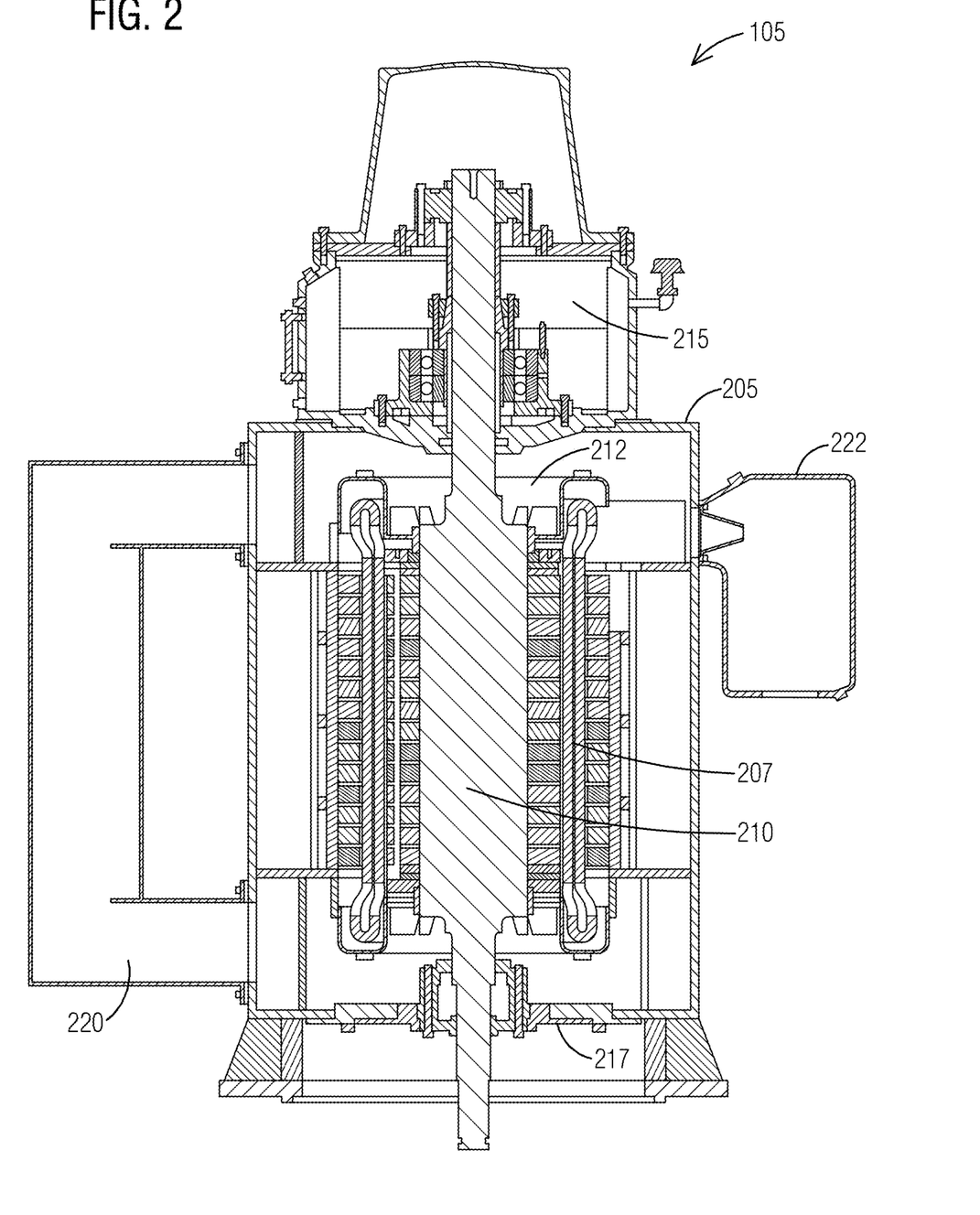
FIG. 2 illustrates a cross-sectional view of the vertical electric machine of FIG. 1 in accordance with an exemplary embodiment of the present invention.

Referring to FIG. 2, it illustrates a cross-sectional view of the vertical electric machine 105 of FIG. 1 along a line A-A' in accordance with an exemplary embodiment of the present invention. The vertical electric machine 105 comprises a frame 205, a stator 207, a rotor 210, air deflectors 212, an upper bearing 215, a lower bearing 217, an enclosure 220, and a terminal box 222. Examples of the vertical electric machine 105 include (based on estimated power ratings) vertical motors of the following sizes with NEMA 500-580 frames.

Figure 3:
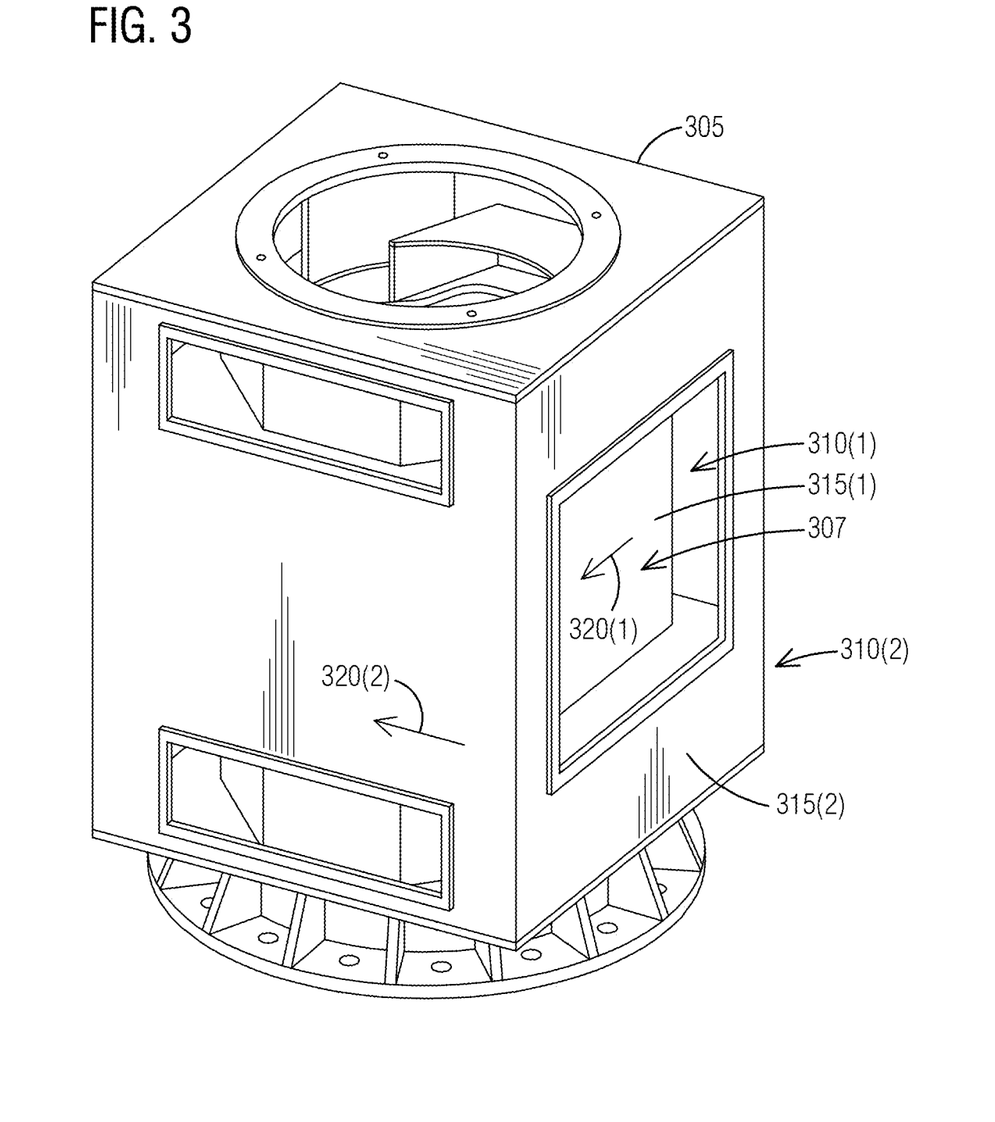
FIG. 3 illustrates a perspective view of a frame of the vertical electric machine of FIG. 1 in accordance with an exemplary embodiment of the present invention.

Turning now to FIG. 3, it illustrates a perspective view of a frame 305 of a vertical electric machine such as the vertical electric machine 105 of FIG. 1 in accordance with an exemplary embodiment of the present invention. The vertical electric machine 105 including the frame 305 comprising a specific structure that defines a double box construction 307. The double box construction 307 includes a first stiffness member 310(1) having a first side wall 315(1) in a lateral "X" direction 320(1). The double box construction 307 includes a second stiffness member 310(2) having a second side wall 315(2) in a lateral "Y" direction 320(2) such that the second side wall 315(2) is rotated 90 degrees relative to the first side wall 315(1). The first stiffness member 310(1) and the second stiffness member 310(2) are configured to produce equal stiffness in both lateral directions "X" and "Y" 320(1, 2).

The double box construction 307 is configured to normalize the specific structure of the vertical electric machine 105 such that its two reed critical frequencies of the first stiffness member 310(1) and the second stiffness member 310(2) occur at a same frequency. The double box construction 307 is configured to reduce block out ranges of reed critical frequencies by eliminating a non-symmetry of the two different lateral directions "X" and "Y" 320(1, 2). The double box construction 307 enables varying of a speed of the vertical electric machine 105 over a relatively large speed ranges by machine users. The double box construction 307 does not require a customer to block out operational ranges that are larger than need be since there is a less or no spread in reed critical frequencies in two different lateral directions "X" and "Y" 320(1, 2).

Figure 4:
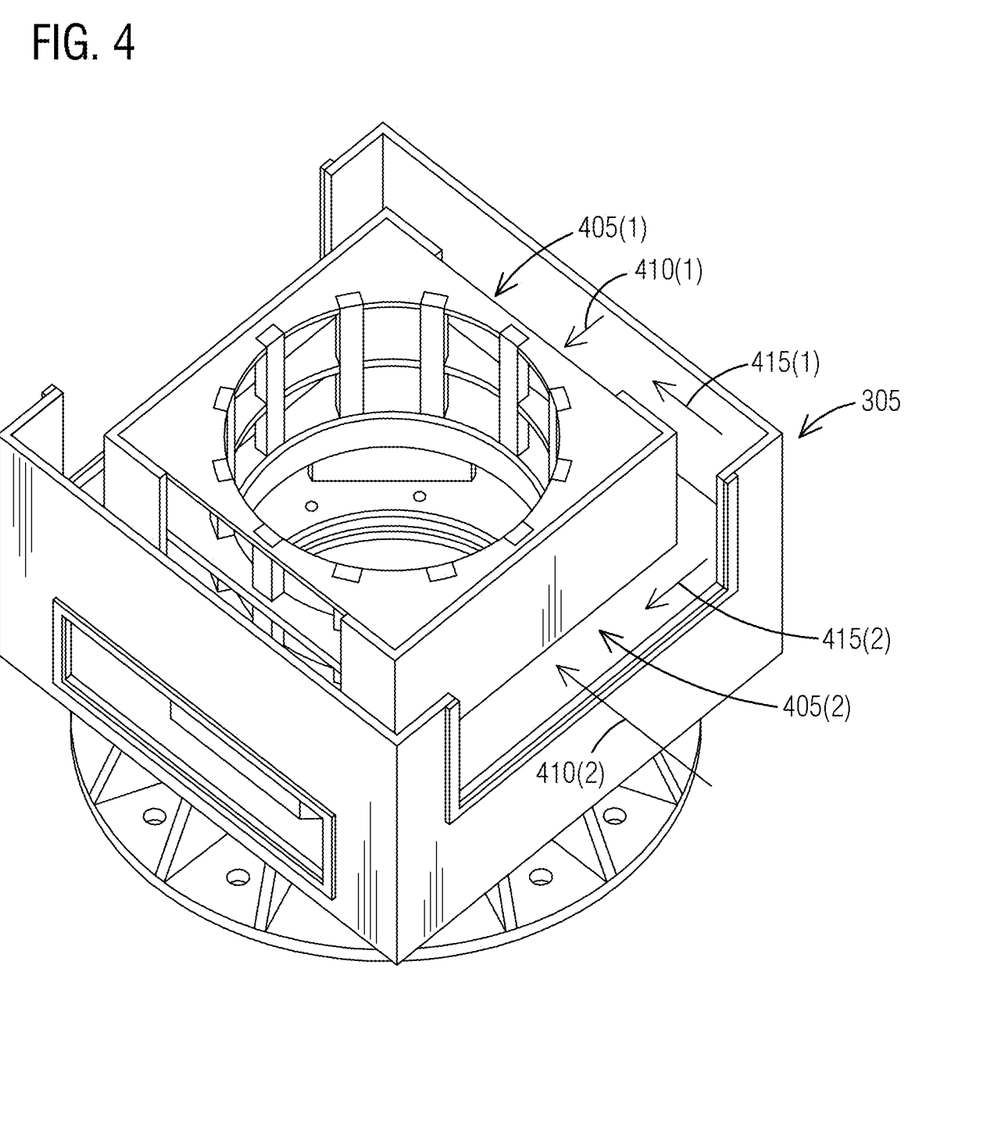
FIG. 4 illustrates a cut view of the frame of the vertical electric machine of FIG. 3 in accordance with an exemplary embodiment of the present invention.

FIG. 4 illustrates a cut view of the frame 305 of the vertical electric machine 105 of FIG. 3 in accordance with an exemplary embodiment of the present invention. The first stiffness member 310(1) has a first cutout 405(1) for an airflow in one direction 410(1). The second stiffness member 310(2) has a second cutout 405(2) for an airflow in another direction 410(2) such that the second cutout 405(2) is rotated 90 degrees to produce an overall stiffness which becomes uniform in both axes 415(1, 2). The second stiffness member 310(2) surrounds the first stiffness member 310(1).

The first cutout 405(1) of the first stiffness member 310(1) for the airflow in the one direction 410(1) produces a higher stiffness axis. The second cutout 405(2) of the second stiffness member 310(2) for the airflow in the another direction 410(2) produces a lower stiffness axis. For the frame 305, frame material may be Cast Iron or Fabricated Steel.

Figure 5:
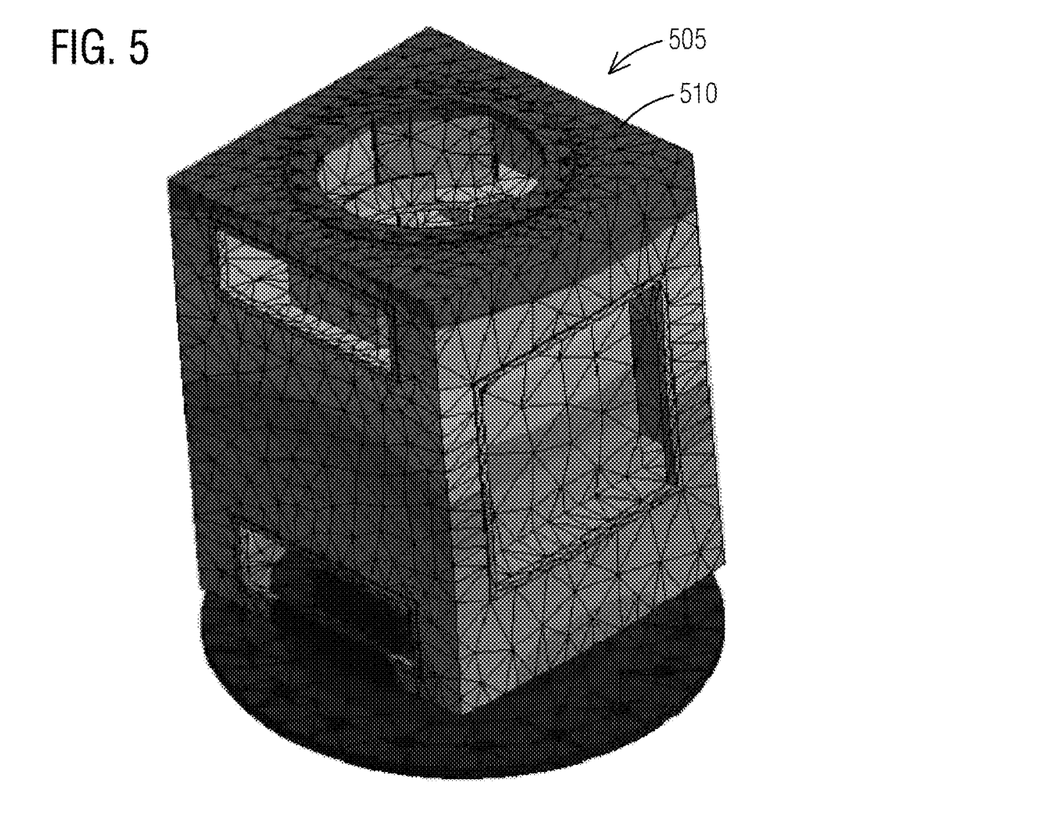
FIG. 5 illustrates a modal analysis model of a frame of the vertical electric machine in accordance with an exemplary embodiment of the present invention.

As seen in FIG. 5, it illustrates a modal analysis model 505 of a frame 510 of the vertical electric machine 105 in accordance with an exemplary embodiment of the present invention. Reed critical frequency (RCF) is the structural natural frequency associated with vertically oriented, cantilevered structures such as the vertical electric machine 105. Major variables that effect the reed critical frequency are: Mass (amount and position of CG), Stiffness of the structure, and Interfacing connections. For development of the vertical electric machine 105 two methods of finite element analysis (FEA) are utilized: Accuracy—Full modal analysis with harmonic excitation and Speed (reduced model)—Static analysis with constant excitation, fixed mass, industry accepted calculations.

The double box construction 307 as shown in FIG. 3 normalizes the vertical electric machine 105 such that its two reed critical frequencies occur at the same frequency. The double box construction 307 reduces the block out ranges of reed critical frequencies by eliminating the non-symmetry of the two different lateral directions "X" and "Y" 320(1, 2). The double box construction 307 solves the problem of machine users not being able to vary the speed of the vertical electric machine 105 over large speed ranges. The double box construction 307 significantly reduces the machine users required block out range. A rectangular box design with cutouts for airflow in one direction produces a higher stiffness axis and a lower stiffness axis as well as a secondary rectangular box design which surrounds the first and has its airflow cutouts rotated 90 degrees to produce an overall stiffness which becomes uniform in both axis.

For the modal analysis, solve time was 18 minutes.
Natural Frequency in the X=19 [Hz]
Natural Frequency in the Z=21 [Hz]
The modal analysis is able to capture higher order and localized mode shapes. It can also quantify the sensitivity of excitation.

For the static analysis, solve time was 5 minutes.
Natural Frequency in the X=22 [Hz]
Natural Frequency in the Z=24 [Hz]
Solve times is 3.6 times faster (important for iterative design runs). It was less than 15% different than modal.

For boundary condition, a pressure cone method is used to assume interfacial contacts of bolted connections. This is very relevant for a flange bolted to a base. There has been good success of this assumption as well as of test correlation of components and assemblies.

Benchmarking can be used to compare the FEA simulated RCF and modal impact tests/coast-down test performed on vertical motors. Bump testing on the simulation showed RCF of 1400 [cpm] (23.3 [Hz]).

In its current state the new high reed critical frequency of fabricated 580 frame open vertical design has a predicted RCF of 80-83 [Hz] based on static calculations. The modal analysis model 505 show slightly higher RCF but needs some additional validation. Opportunities likely exist to optimize the standard legacy components as well as the preliminary design concept (i.e. flange diameter looks like it could be reduced).

Figure 6:
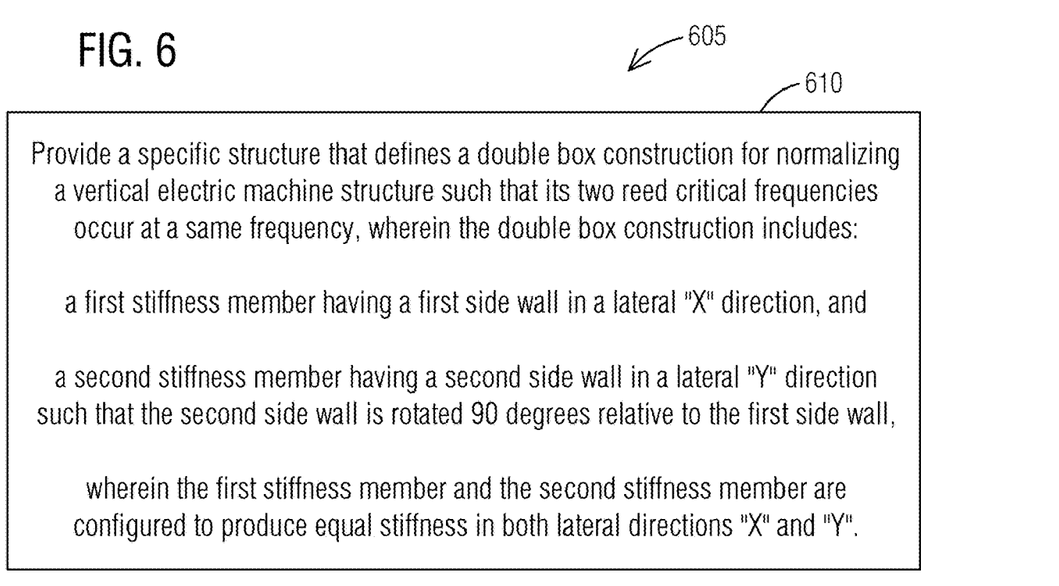
FIG. 6 illustrates a schematic view of a flow chart of a method of normalizing a vertical electric machine structure such that its two reed critical frequencies occur at a same frequency in accordance with an exemplary embodiment of the present invention.

As shown in FIG. 6, it illustrates a schematic view of a flow chart of a method 605 of normalizing the vertical electric machine 105 structure such that its two reed critical frequencies occur at a same frequency in accordance with an exemplary embodiment of the present invention. Reference is made to the elements and features described in FIGS. 1-5. It should be appreciated that some steps are not required to be performed in any particular order, and that some steps are optional.

The method 605 comprises a step 610 of providing a specific structure that defines a double box construction. The double box construction includes a first stiffness member having a first side wall in a lateral "X" direction and a second stiffness member having a second side wall in a lateral "Y" direction such that the second side wall is rotated 90 degrees relative to the first side wall. The first stiffness member and the second stiffness member are configured to produce equal stiffness in both lateral directions "X" and "Y".

While a vertical electric machine as a vertical motor is described here a range of one or more other vertical structures or other forms of vertical machines are also contemplated by the present invention. For example, other types of vertical pumps may be implemented based on one or more features presented above without deviating from the spirit of the present invention.

The techniques described herein can be particularly useful for a double box construction as a rectangular box design. While particular embodiments are described in terms of a double rectangular box structure, the techniques described herein are not limited to such a structure but can also be used with other normalizing structures or configurations.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A vertical electric machine, comprising:
a specific structure that defines a double box construction such that a geometry of the double box construction has a specific area of relief that normalizes the specific structure of the vertical electric machine, wherein the double box construction includes:
a first stiffness member having a first side wall in a lateral "X" direction, and
a second stiffness member having a second side wall in a lateral "Y" direction such that the second side wall is rotated 90 degrees relative to the first side wall,
wherein the first stiffness member having a first geometric shape and the second stiffness member having a second geometric shape such that the first stiffness member and the second stiffness member geometrically produce equal stiffness in both lateral directions "X" and "Y" by normalizing the specific structure of the vertical electric machine such that its two lateral reed critical frequencies of the first stiffness member and the second stiffness member being perpendicular to each other occur at a same frequency,
wherein the first stiffness member being an inner box having a first cutout for a first window in a first axis,
wherein the second stiffness member being an outer box having a second cutout for a second window in a second axis such that the double box construction is configured to reduce block out ranges of the two lateral reed critical frequencies by eliminating a non-symmetry of stiffness or the two lateral reed critical frequencies in the two different lateral directions "X" and "Y".

2. The vertical electric machine of claim 1, wherein the double box construction enables increased operating speed ranges by machine users.

3. The vertical electric machine of claim 1, wherein the double box construction does not require blocking out operational ranges since there is no spread in the two lateral reed critical frequencies in two different lateral directions "X" and "Y".

4. The vertical electric machine of claim 1, wherein the first stiffness member having the first cutout for an airflow in one direction.

5. The vertical electric machine of claim 4, wherein the second stiffness member having the second cutout for an airflow in another direction such that the second cutout is rotated 90 degrees to produce an overall stiffness which becomes uniform in both axes.

6. The vertical electric machine of claim 5, wherein the first cutout of the first stiffness member for the airflow in the one direction produces a increased stiffness axis.

7. The vertical electric machine of claim 6, wherein the second cutout of the second stiffness member for the airflow in the another direction produces a decreased stiffness axis.

8. A method comprising:
providing a specific structure that defines a double box construction such that a geometry of the double box construction has a specific area of relief that normalizes the specific structure of the vertical electric machine, wherein the double box construction includes:
a first stiffness member having a first side wall in a lateral "X" direction, and
a second stiffness member having a second side wall in a lateral "Y" direction such that the second side wall is rotated 90 degrees relative to the first side wall,
wherein the first stiffness member having a first geometric shape and the second stiffness member having a second geometric shape such that the first stiffness member and the second stiffness member geometrically produce equal stiffness in both lateral directions "X" and "Y" by normalizing the specific structure of the vertical electric machine such that its two lateral reed critical frequencies of the first stiffness member and the second stiffness member being perpendicular to each other occur at a same frequency,
wherein the first stiffness member being an inner box having a first cutout for a first window in a first axis,
wherein the second stiffness member being an outer box having a second cutout for a second window in a second axis such that the double box construction is configured to reduce block out ranges of the two lateral reed critical frequencies by eliminating a non-symmetry of stiffness or the two lateral reed critical frequencies in the two different lateral directions "X" and "Y".

9. The method of claim 8, wherein the double box construction enables increased operating speed ranges by machine users.

10. The method of claim 8, wherein the double box construction does not require blocking out operational ranges since there is no spread in the two lateral reed critical frequencies in two different lateral directions "X" and "Y".

11. The method of claim 8, wherein the first stiffness member having the first cutout for an airflow in one direction.

12. The method of claim 11, wherein the second stiffness member having the second cutout for an airflow in another direction such that the second cutout is rotated 90 degrees to produce an overall stiffness which becomes uniform in both axes.

13. The method of claim 12, wherein the first cutout of the first stiffness member for the airflow in the one direction produces a increased stiffness axis.

14. The method of claim 13, wherein the second cutout of the second stiffness member for the airflow in the another direction produces a decreased stiffness axis.

* * * * *